(12) United States Patent
Liang et al.

(10) Patent No.: US 10,379,558 B2
(45) Date of Patent: Aug. 13, 2019

(54) DYNAMICALLY RESPONDING TO DEMAND FOR SERVER COMPUTING RESOURCES

(71) Applicant: Facebook, Inc., Menlo Park, CA (US)

(72) Inventors: Xiaojun Liang, San Jose, CA (US); Yusuf Abdulghani, Fremont, CA (US); Ming Ni, Campbell, CA (US); Hongzhong Jia, Cupertino, CA (US); Jason Taylor, Berkeley, CA (US)

(73) Assignee: Facebook, Inc., Menlo Park, CA (US)

( * ) Notice: Subject to any disclaimer, the term of this patent is extended or adjusted under 35 U.S.C. 154(b) by 341 days.

(21) Appl. No.: 14/458,677

(22) Filed: Aug. 13, 2014

(65) Prior Publication Data

US 2016/0048185 A1    Feb. 18, 2016

(51) Int. Cl.
*G06F 1/26* (2006.01)
*G05F 1/66* (2006.01)
*G06F 1/3206* (2019.01)
*G06F 9/50* (2006.01)

(52) U.S. Cl.
CPC .............. *G05F 1/66* (2013.01); *G06F 1/3206* (2013.01); *G06F 9/5094* (2013.01)

(58) Field of Classification Search
CPC .................................................. G06F 1/3203
See application file for complete search history.

(56) References Cited

U.S. PATENT DOCUMENTS

| 8,566,627 | B2 | 10/2013 | Halepete et al. | |
|---|---|---|---|---|
| 9,146,814 | B1 * | 9/2015 | van der Merwe | .. G06F 11/3031 |
| 9,229,507 | B1 * | 1/2016 | Hennecke | ................. G06F 1/26 |
| 9,563,216 | B1 * | 2/2017 | Barroso | ..................... G05F 1/66 |
| 2004/0163001 | A1 * | 8/2004 | Bodas | ..................... G06F 1/206 |
| | | | | 713/300 |
| 2008/0301479 | A1 * | 12/2008 | Wood | .................... G06F 1/3203 |
| | | | | 713/322 |
| 2010/0211810 | A1 * | 8/2010 | Zacho | ................... G06F 1/3203 |
| | | | | 713/324 |
| 2017/0192488 | A1 | 7/2017 | Wu | |
| 2017/0195408 | A1 | 7/2017 | Wu | |

OTHER PUBLICATIONS

U.S. Appl. No. 15/832,704 by Lin, K, et al., filed Dec 5, 2017.
U.S. Appl. No. 15/257,310 by Wu, Q, et al., filed Sep. 6, 2016.
U.S. Appl. No. 15/262,986 by Wu, Q, et al., filed Sep. 12, 2016.
U.S. Appl. No. 15/709,434 by Deng, Q., et al., filed Sep. 19, 2017.

* cited by examiner

*Primary Examiner* — Kim Huynh
*Assistant Examiner* — Eric Chang
(74) *Attorney, Agent, or Firm* — FisherBroyles, LLP

(57) ABSTRACT

Embodiments are described for dynamically responding to demand for server computing resources. The embodiments can monitor performance of each of multiple computing systems in a data center, identify a particular computing system of the multiple computing systems for allocation of additional computing power, determine availability of an additional power supply to allocate to the identified computing system, determine availability of a capacity on a power distribution line connected to the particular computing system to provide the additional power supply to the particular computing system, and allocate the additional computing power to the identified computing system as a function of the determined availability of the additional power supply and the determined availability of the capacity on the power distribution line.

19 Claims, 6 Drawing Sheets

DYNAMICALLY RESPONDING TO DEMAND FOR SERVER COMPUTING RESOURCES

BACKGROUND

Data centers can be subdivided into physical suites, rows, and racks, and electrical power ("power") can be budgeted for each subdivision. A server computing device ("server") is typically a smallest computing unit in a data center. Multiple server computing devices can operate in a rack, which is a vertical collection of server computing devices. Multiple racks can be organized in rows, and multiple rows can be placed in a suite. To ensure that adequate power is supplied during a common or peak demand, the power can be "budgeted," meaning that various configuration limits can be placed based on the available power. For example, the number of rows, racks, or servers can be limited based on the available power. The budget may include a surplus allowance, e.g., to respond to unexpected surges in demand for power.

To ensure that the power draw does not exceed a budget for each subdivision, various circuit breakers (CBs) or other overcurrent protective devices (OPDs) may be placed in-line with the power supply. These OPDs can be triggered to switch off power when more power than expected is drawn. The amount of power that is supplied before the OPD is triggered to an off state can be a function of temperature: as temperature increases, the triggering current is reduced.

Servers can also be logically subdivided into "clusters," that can perform tasks jointly or commonly with other servers in the same cluster. For example, data center operators can subdivide servers logically into clusters of application (e.g., "front end" web servers), database servers, caching servers, and so forth. These various "types" of servers may be configured with different hardware and/or software. For example, application servers may be configured with superior class of central processing units (CPUs) but reduced secondary storage space (e.g., hard disk drives, solid state drives, or other data storage devices) as compared to database servers. In contrast, caching servers may be configured with very fast solid state drives with a high amount of capacity. The various components of these different server configurations (e.g., CPU, data storage device, etc.) can consume different amounts of power.

Although data center operators, application developers, database administrators, and others may design a server infrastructure and distribute data in such a way that demand for server computing devices balanced across multiple servers in a cluster, there can be unexpected bursts of demand. As an example, in a social network application, although activity by users can be generally predicted with a reasonable degree of confidence, a burst of activity can occur when celebrities post "updates" or otherwise engage with their fans. Failing to respond to such bursts of demand can cause various unintended overall degradation of performance. As an example, if a caching server is negatively impacted by a surge in demand, the performance degradation can impact many other servers and/or applications and services.

The Background section of this document is provided to place embodiments of the disclosed technology in technological and operational context to assist those of skill in the art in understanding their scope and utility. Unless explicitly identified as such, no statement herein is admitted to be prior art merely by its inclusion in the Background section.

BRIEF DESCRIPTION OF THE DRAWINGS

The embodiments may be better understood by referring to the following Detailed Description in conjunction with the accompanying drawings, in which like reference numerals indicate identical or functionally similar elements.

DETAILED DESCRIPTION

Overview

Figure 1:
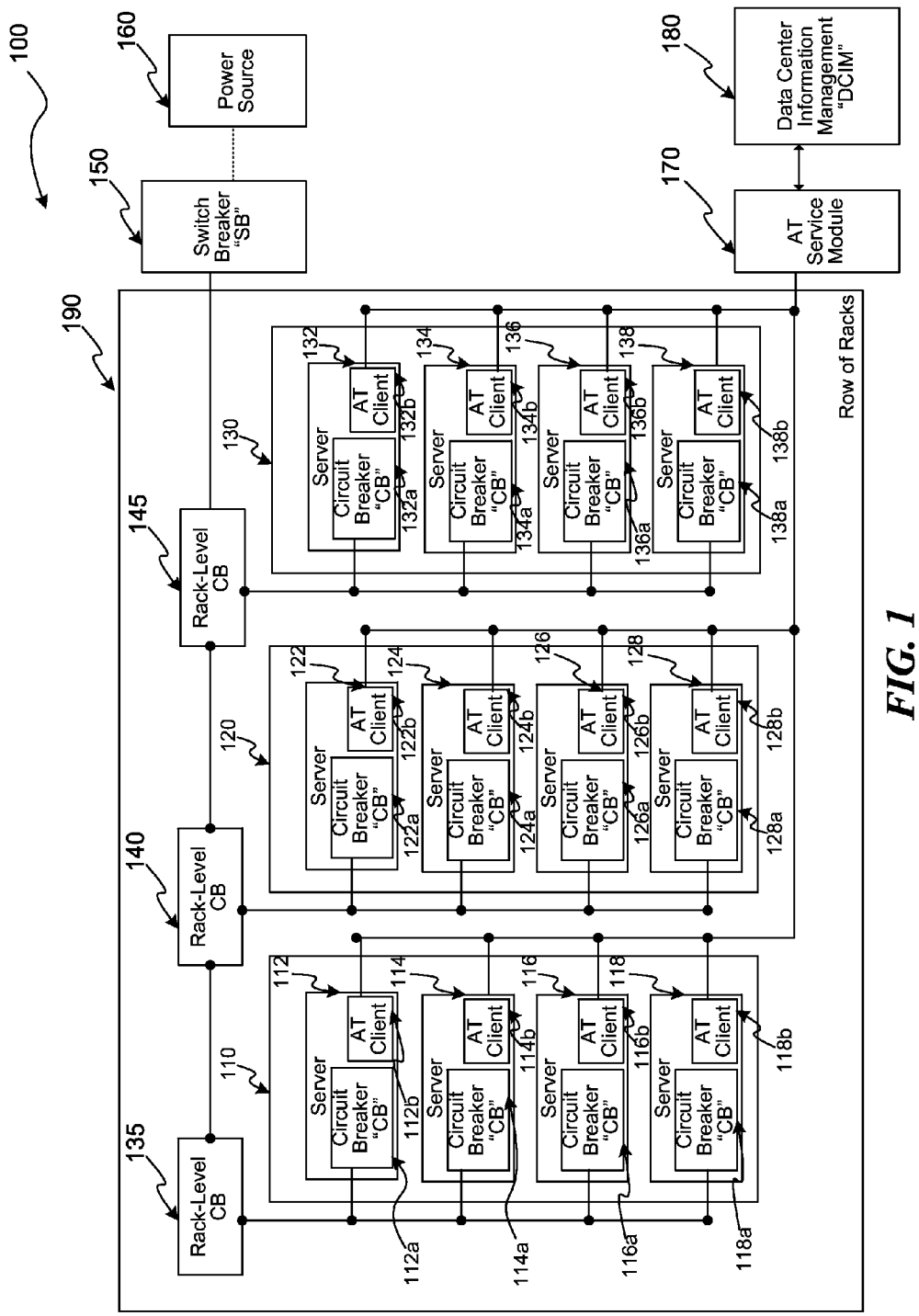
FIG. 1 is a schematic drawing illustrating components of a data center, consistent with various embodiments.

An Adaptive Turbo ("AT") service is disclosed for managing power and thermal issues in data centers, e.g., at a suite level (or other physical subdivisions of server computing devices) or at a cluster level (or other logical subdivisions of server computing devices). In various embodiments, the AT service includes AT clients that execute at data servers being managed by the AT service. An AT client monitors its associated data servers to determine if the data servers are exceeding performance thresholds, e.g., CPU utilization, cache miss latency, etc. A data server that is exceeding specified performance thresholds is characterized as being running "hot." When a data server is running hot, in some embodiments, the AT invokes an application program interfaced provided by the AT service to indicate that a performance boost may be desirable, i.e., additional CPU cycles. In various embodiments, the AT clients can report performance attributes. In various embodiments, the AT service may "poll" the AT clients for performance attributes.

Various central processor unit ("CPU") architectures provide "turbo boost" modes. As an example, some Intel® CPU architectures provide a turbo boost mode which, when activated, causes the CPU to execute instructions above its base operating frequency via dynamic control of the CPU's clock rate. The increased clock rate may be limited by the processor's power, current and thermal limits. The AT service may track associations between turbo boost modes and expected electrical power demands and expected thermal changes. As an example, the AT service may store one or more tables associating the various attributes, e.g., so that electrical power and thermal changes can be predicted as a function of a particular turbo boost mode.

When the AT service receives a request for additional computing power, the AT service checks the available electrical power buffer to determine if additional electrical power is available that, if drawn, would not trigger power protection systems, e.g., circuit breakers. The AT service may also check for expected thermal changes. If it is possible to assign additional power to server computing devices without triggering power protection systems, the AT service The AT service assigns the extra computing power to the requested data server(s) when there is sufficient power buffer available to support the additional computing power and when the various power protection systems will not be overloaded by the assignment.

In some embodiments, the AT service assigns the extra computing power by commanding an AT client (e.g., daemon) executing on one or more of the hot data servers to turn on the turbo settings associated with the CPU in the data server, where the turbo settings can be tuned to multiple computing performance levels. Further, the AT service actively monitors the data servers that have been granted the extra computing power, and revokes the grant of extra computing power when the data servers cool down, i.e., when the data server stops exceeding the various predefined performance thresholds.

The AT service revokes the grant by requesting the AT daemon to turn off the turbo settings associated with the allocation of extra computing power. In some embodiments, the AT service also actively revokes the grant of computing power when the power buffer is limited and a service being hosted by a data server has higher priority than those services hosted by data servers that have been currently allocated extra computing power.

In some embodiments, the AT service can track and store historical power usage patterns (e.g., time-of-day loads, etc.), and use this historical power usage patterns to determine whether to assign extra computing power to data servers. For example, if additional computing load is predicted to occur soon, the AT service can decline to supply extra computing power because idle servers are likely to draw additional power.

General Description

Various examples of the techniques introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Several embodiments of the disclosed real-time index system are described in more detail in reference to the Figures. Turning now to Figures, FIG. 1 is a schematic drawing illustrating components of a data center, consistent with various embodiments. Components 100 can include racks 110, 120, and 130 together (possibly with other racks, not illustrated) in a row of racks 190. Each rack can have one or more server computing devices ("servers"), e.g., servers 112, 114, 116, 118, 122, 124, 126, 128, 132, 134, 136, and 138. Servers 112, 114, 116, and 118 are in rack 110, servers 122, 124, 126, and 128, are in rack 120, and servers 132, 134, 136, and 138 are in rack 130. The racks 110, 120, and 130, each have an associated rack-level circuit breaker (CB), e.g., CB 135, CB 140, and CB 145, respectively. Each CB is in-line between its corresponding rack and a power source 160. Each server has its own CB, e.g., CBs 112a, 114a, 116a, 118a, 122a, 124a, 126a, 128a, 132a, 134a, 136a, and 138a corresponding to servers 112, 114, 116, 118, 122, 124, 126, 128, 132, 134, 136, and 138, respectively. Furthermore, a switch breaker (SB) 150 is in-line between the power source 160 and the row of racks 190. As is known in the art, the various SBs and CBs are designed to limit power that is drawn, and can have a power rating or capacity. The power capacity of the CBs and SBs can decrease as temperature increases. Each server 112, 114, 116, 118, 122, 124, 126, 128, 132, 134, 136, and 138 also has associated therewith an adaptive turbo (AT) client, e.g., AT clients 112b, 114b, 116b, 118b, 122b, 124b, 126b, 128b, 132b, 134b, 136b, and 138b corresponding to servers 112, 114, 116, 118, 122, 124, 126, 128, 132, 134, 136, and 138, respectively. The AT clients can be software or hardware components designed to control the turbo mode of one or more processors (e.g., central processing units (CPUs) or CPU cores) associated with a corresponding server. The AT clients may be controlled, e.g., via an operating system executing at the servers, to monitor or configure processors associated with their corresponding server, e.g., via an application program interface (API). The components 100 can also include an AT service module 170 and a data center information management (DCIM) component 180. The AT service module can communicate with the various AT clients 112b, 114b, 116b, 118b, 122b, 124b, 126b, 128b, 132b, 134b, 136b, and 138b, e.g., to enable or disable turbo mode of their corresponding processors. The AT service module 170 can also exchange data with the DCIM component 180, e.g., to determine how much power is presently being drawn by the various servers, racks, or other data center components, e.g., to determine whether turbo mode can be enabled, which turbo level, and for how many processors. For example, if most servers are operating under low load, high turbo mode and level can be enabled. The higher the level, the more power that is drawn and them more heat that is generated. If, however, most servers are operating under high load, turbo mode may be limited, e.g., by the available power and current temperature.

Figure 2:
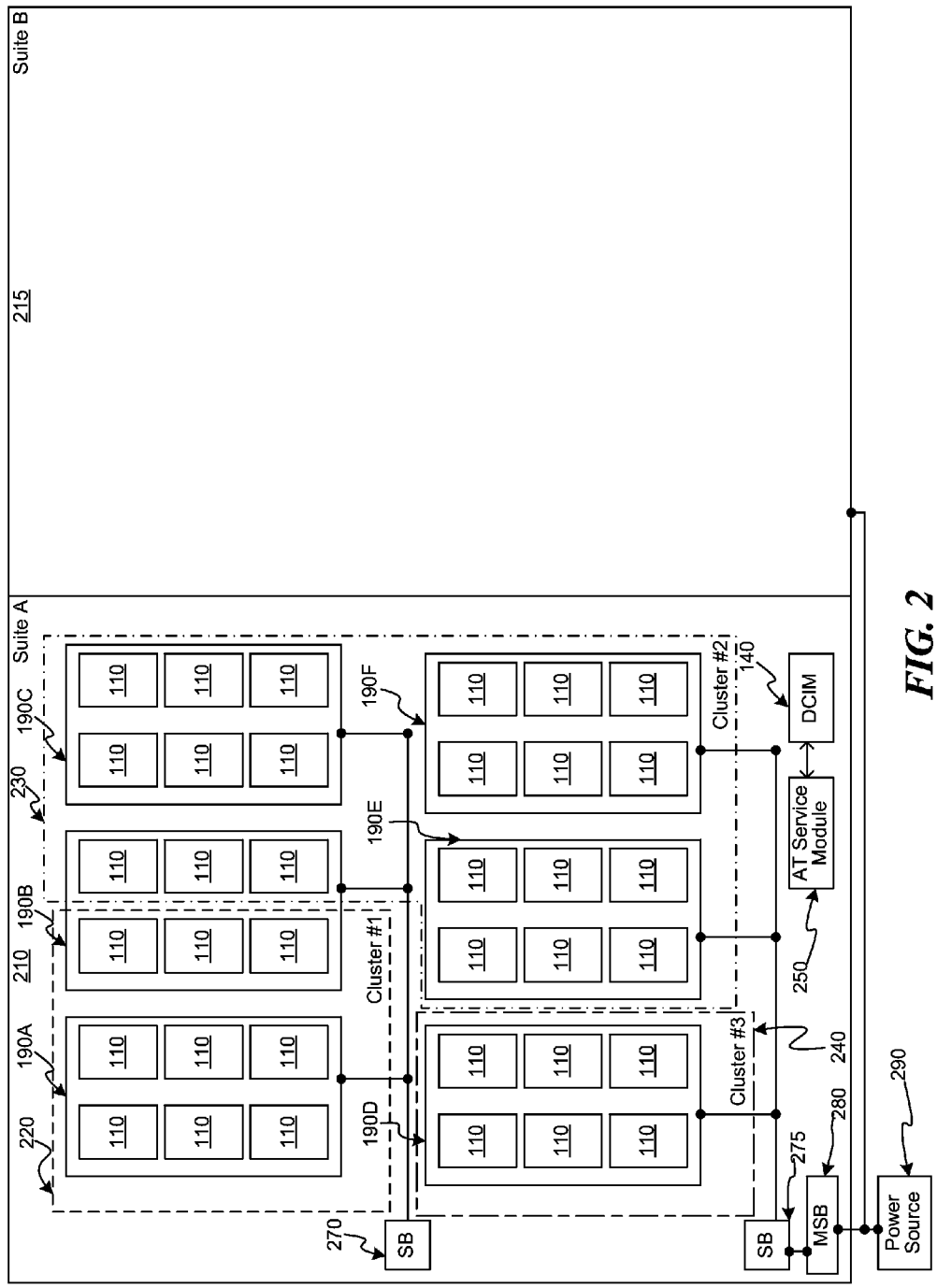
FIG. 2 is a schematic drawing illustrating components of a data center, consistent with various embodiments.

FIG. 2 is a schematic drawing illustrating components of a data center, consistent with various embodiments. The illustrated data center has two "suites," suite A 210 and suite B 220. Additional suites (not illustrated) can also exist. The various suites each draw power from a power source 290, e.g., via an in-line master switch breaker (MSB) 280. The power is then supplied via SBs, e.g., SBs 270 and 275, to one or more rows of racks 190. As described above in relation to FIG. 1, each rack 190 can have associated therewith one or more racks 110. In various embodiments, rows of racks 190, racks 110, or even various servers of each rack (illustrated in FIG. 1) can be logically configured as "clusters." A cluster is a group of servers that can perform tasks jointly or commonly with other servers in the same cluster. In the illustrated example, each cluster is circumscribed by dashed line segments. Cluster #1 (220) includes a full row of racks 190A and shares a half row of racks 190B with cluster #2 (230). Cluster #3 (240) has a single row of racks 190D. Cluster #2 (230) has three full rows of racks 190C, 190E, and 190F, and shares the half row of racks 190B with cluster #1 (220). In various embodiments, clusters may be limited to a single row of racks, multiple full rows or racks, or even a single rack. The AT Service Module 250 and the DCIM 140 may together monitor power usage, temperature, and other attributes across the various components of one or more suites, e.g., to determine how much power can be allocated to enable turbo mode on multiple processors.

Figure 3:
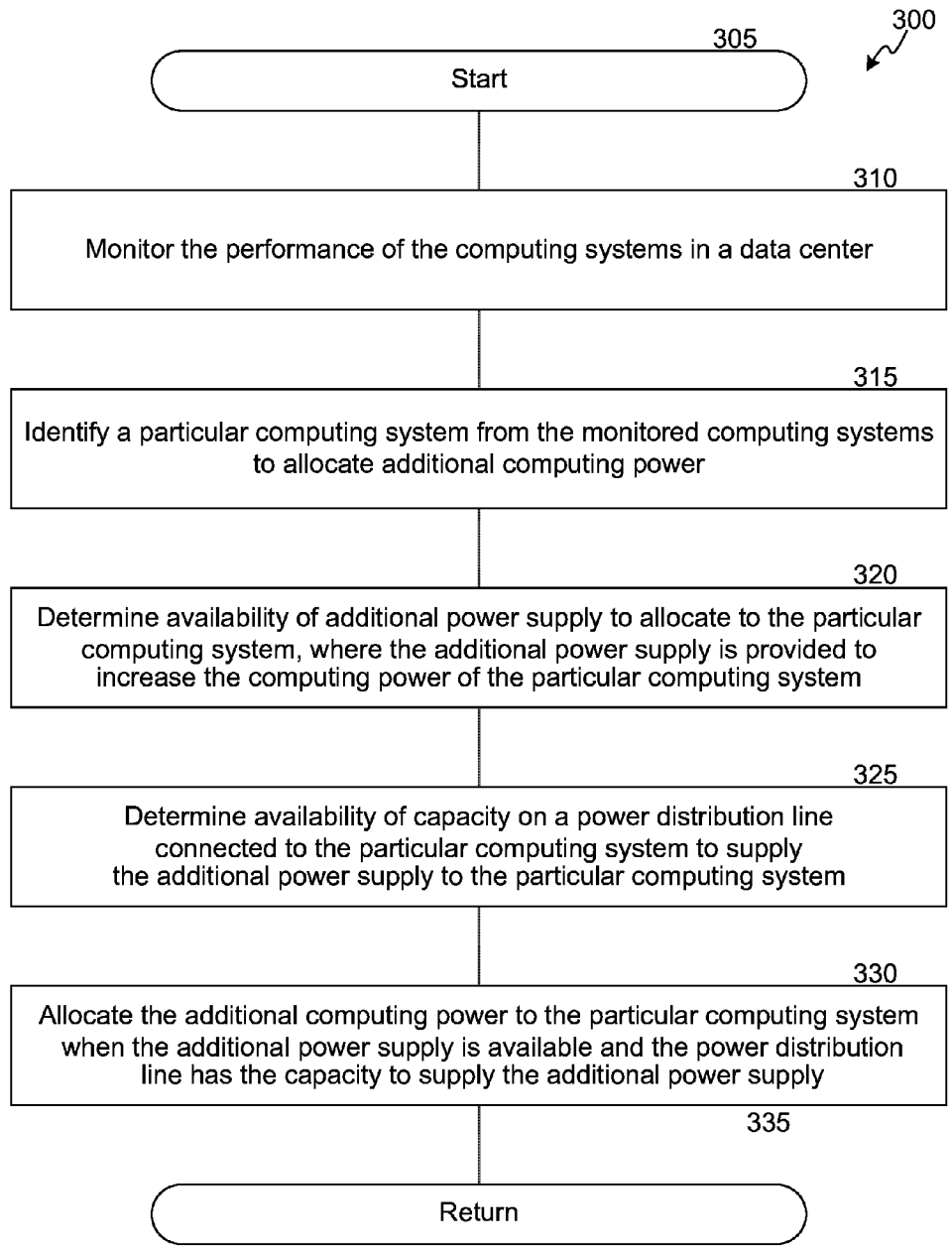
FIG. 3 is a flow diagram illustrating a routine invoked by various embodiments.

FIG. 3 is a flow diagram illustrating a routine 300 invoked by various embodiments, e.g., to identify a computing system that could benefit from enabling turbo mode. The routine 300 begins at block 305. At block 310, the routine 300 monitors the performance of computing systems in a data center. Attributes that are monitored can include, e.g., processor utilization, latency, and/or other performance attributes. In various embodiments, when processor utilization or latency exceeds various specified thresholds, the routine 300 may be invoked. At block 315, the routine 300 identifies a particular computing system from among the monitored computing systems to which additional computing power can be allocated, e.g., by enabling a turbo mode. At block 320, the routine 300 determines how much additional electrical power is available to provide to the identified computing system. In various embodiments, a database or a table may indicate how much power is required for the various turbo mode levels. At block 325 the routine 300 determines the availability of electrical capacity on a power distribution line connected to the identified computing system, e.g., to supply the additional required electrical power to the identified computing system. As an example, if too much power is drawn at the computing system, one or more in line CBs may be triggered, which would cause many computing systems to be switched off. At block 330, the routine 300 allocates additional computing power to the identified computing system when additional electrical power is available and the power distribution line has capacity to supply the additional electrical power. As an example, if three different turbo mode levels are available, each drawing different amounts of electrical power, the routine 300 may select the turbo mode level that draws a sufficient amount of electrical power that would not trigger one or more of the in-line CBs. At block 335, the routine 300 returns.

Those skilled in the art will appreciate that the logic illustrated in FIG. 3 and described above, and in each of the flow diagrams discussed below, may be altered in various ways. For example, the order of the logic may be rearranged, substeps may be performed in parallel, illustrated logic may be omitted, other logic may be included, etc.

Figure 4:
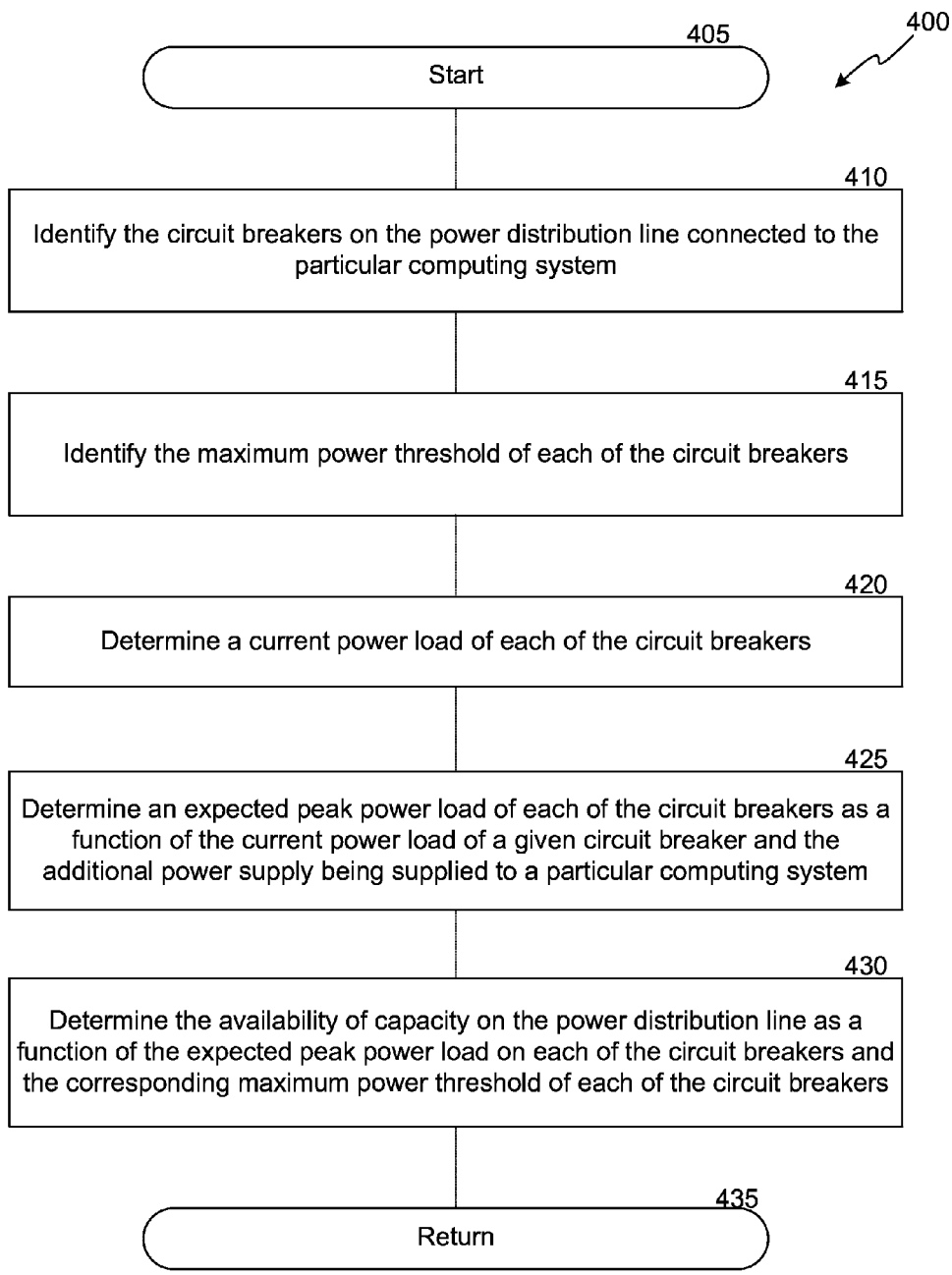
FIG. 4 is a flow diagram illustrating a routine invoked by various embodiments.

FIG. 4 is a flow diagram illustrating a routine 400 invoked by various embodiments, e.g., to determine how much electrical power can be supplied to a computing system identified by the routine of FIG. 3. The routine 400 begins at block 405. At block 410, the routine 400 identifies CBs in-line on the electrical power distribution line connected to an identified computing system (e.g., the computing system identified above in relation to FIG. 5). At block 415, the routine 400 identifies the maximum power threshold of each of the in-line CBs. At block 420, the routine 400 determines a current electrical power load on each of the identified CBs. As an example, the routine can query the DCIM or other components to determine the current power load for other components in-line with the identified computing system. At block 425, the routine 400 determines an expected peak electrical power load of each of the CBs as a function of the current electrical power load of a given CB and the additional power supply being supplied to the identified computing system. At block 430, the routine 400 determines the availability of electrical capacity on the electrical power distribution line as a function of the expected peak electrical power load on each of the CBs and the corresponding maximum electrical power threshold of each of the in-line CBs. At block 435, the routine 400 returns.

Figure 5:
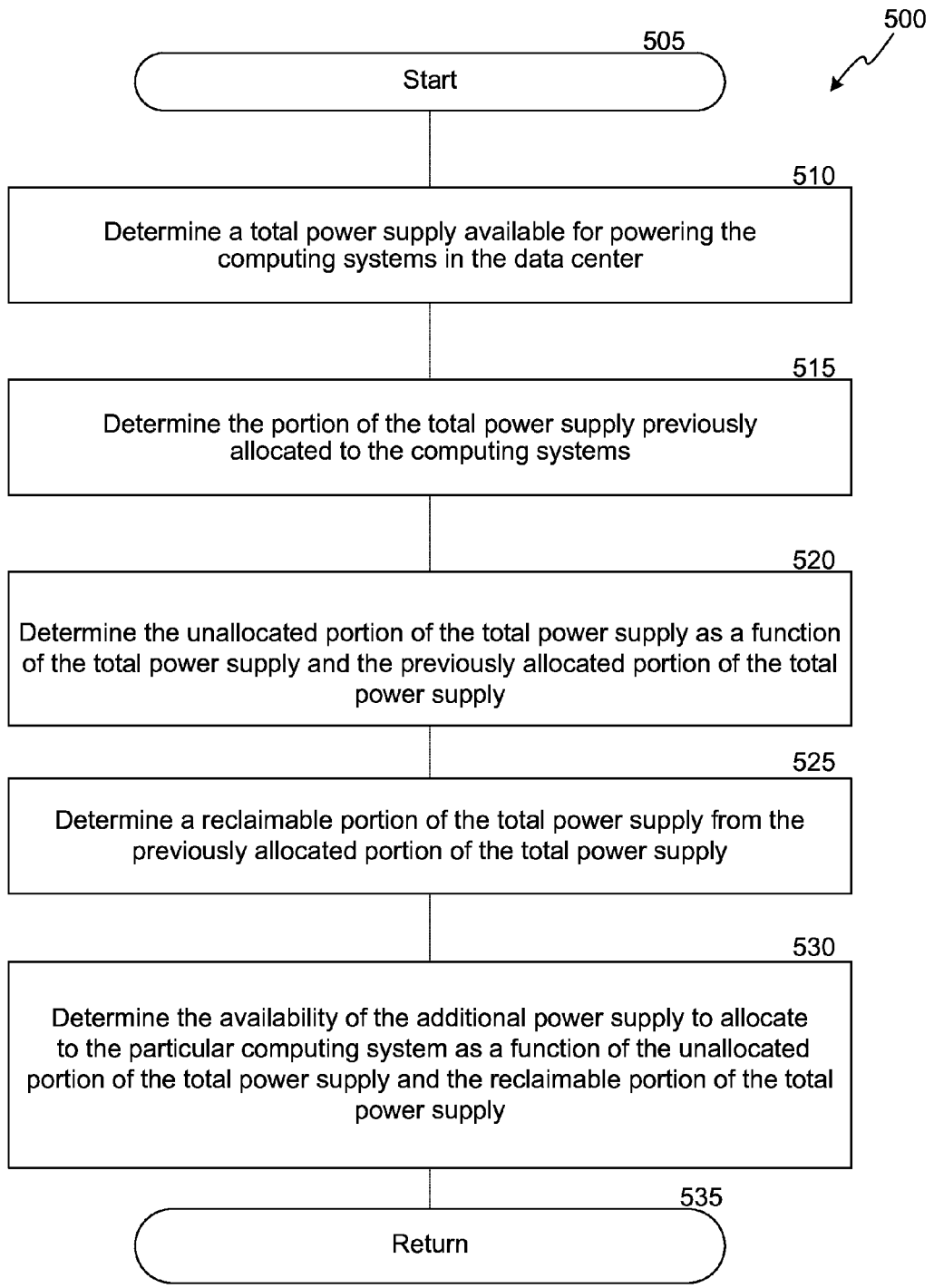
FIG. 5 is a flow diagram illustrating a routine invoked by various embodiments.

FIG. 5 is a flow diagram illustrating a routine 500 invoked by various embodiments, e.g., to reclaim power supply previously provided to an identified computing system. The routine 500 begins at block 505. At block 510, the routine 500 determines a total electrical power supply available for powering the computing systems in the data center. At block 515, the routine 500 determines the portion of the total electrical power supply previously allocated to the computing systems. At block 520, the routine 500 determines the unallocated portion of the total electrical power supply as a function of the total electrical power supply and the previously allocated portion of the total electrical power supply.

At block 525, the routine 500 determines a reclaimable portion of the total electrical power supply from the previously allocated portion of the total electrical power supply. At block 530, the routine 500 determines availability of the additional electrical power supply to an identified computing system as a function of the unallocated power of the total electrical power supply and the reclaimable portion of the total electrical power supply. The routine 500 then returns at block 535.

Figure 6:
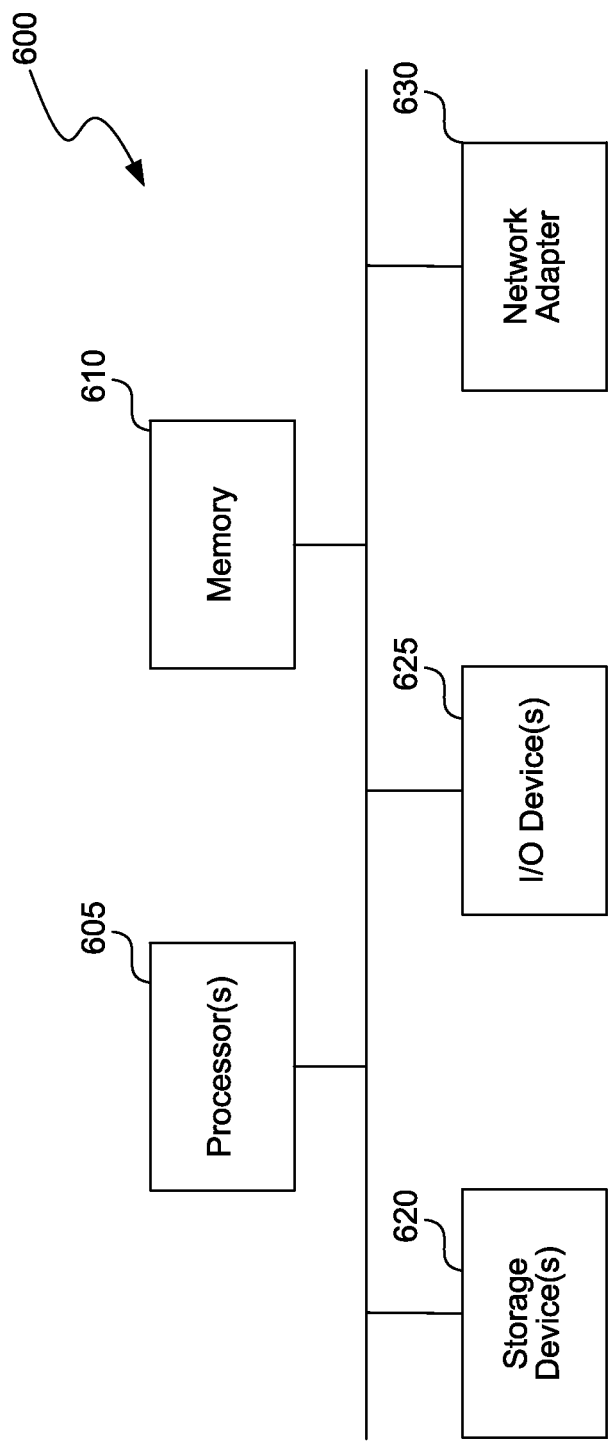
FIG. 6 is a block diagram of a computer system as may be used to implement features of some of the embodiments.

FIG. 6 is a block diagram of a computer system as may be used to implement features of some of the embodiments. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

The headings provided herein are for convenience only and do not necessarily affect the scope or meaning of the claimed embodiments. Further, The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

What is claimed is:

1. A method, comprising:
   monitoring, by a processor, performance of each given computing system of multiple computing systems in a data center, the monitoring including gathering a utilization of a central processing unit of the given computing system determined as a function of a total number of idle compute cycles of the central processing unit in a given time period, and gathering a latency associated with an input/output (IO) operation;
   identifying a particular computing system of the multiple computing systems using the monitored performance by determining a current state of execution of the particular computing system as a function of the gathered utilization of the central processing unit and the gathered latency associated with the IO operation, the particular computing system being identified for an allocation of additional computing power;
   determining availability of an additional power supply to allocate to the particular computing system, the additional power supply being a function of the additional computing power;
   determining availability of a capacity on a power distribution line connected to the particular computing system to provide the additional power supply to the particular computing system by predicting a peak power load of the power distribution line as a function of a current power load and historical power usage patterns, and determining a difference between the predicted peak power load and a maximum power threshold of the power distribution line; and
   allocating the additional computing power to the particular computing system as a function of the determined availability of the additional power supply and the determined availability of the capacity on the power distribution line.

2. The method of claim 1, wherein allocating the additional computing power to the particular computing system further comprises:
   sending a signal to the particular computing system to change a performance state of a central processing unit of the particular computing system, the performance state being changed from a first performance state to a second performance state,
   wherein the central processing unit in the second performance state has a greater number of compute cycles in a given time period than the central processing unit in the first performance state, a portion of the additional power supply being drawn by the particular computing system when the performance state of the central processing unit is changed from the first performance state to the second performance state.

3. The method of claim 1, wherein determining the availability of the capacity on the power distribution line further comprises:
   determining a current power load of a circuit breaker associated with the power distribution line connected to the particular computing system;
   determining an expected peak power load of the circuit breaker as a function of the current power load and the additional power supply; and
   determining the availability of the capacity on the power distribution line as a function of the expected peak power load of the circuit breaker and a maximum power threshold of the circuit breaker.

4. The method of claim 1, wherein determining the availability of the additional power supply to allocate to the particular computing system further comprises:
   determining a total power supply available to the multiple computing systems in the data center;

determining a portion of the total power supply previously allocated to the multiple computing systems;
determining an unallocated portion of the total power supply as a function of the total power supply and the previously allocated portion of the total power supply;
determining a reclaimable portion of the total power supply from the previously allocated portion of the total power supply, the reclaimable portion of the total power supply being determined as a function of a portion of the total power supply previously allocated to a subset of the multiple computing systems,
wherein each of the subset of the multiple computing systems is executing a lower priority task compared to a priority of a task being executed by the particular computing system; and
determining the availability of the additional power supply to allocate to the particular computing system as a function of the determined unallocated portion of the total power supply and the determined reclaimable portion of the total power supply.

5. The method of claim 1, wherein identifying the particular computing system of the multiple computing systems using the monitored performance for allocation of additional computing power further comprises:
identifying the particular computing machine using the monitored performance for allocation of additional computing power when the current state of execution of the particular computing system exceeds a predetermined execution threshold.

6. The method of claim 5, further comprising:
monitoring the performance of the particular computing system after allocating the additional computing power to the particular computing system; and
revoking the allocation of the additional computing power when the current state of execution of the particular computing system is lower than the predetermined execution threshold.

7. The method of claim 1, further comprising:
predicting thermal changes to the particular computing system resulting from the additional computing power to the particular computing system; and
in response to the predicted thermal changes exceeding thermal limits of the particular computing device, reducing the allocation of the additional computing power to the particular computing system.

8. A system, comprising:
a processor and memory;
a component configured to monitor performance of each given computing system of multiple computing systems in a data center, wherein monitoring performance includes gathering a utilization of a central processing unit of the given computing system determined as a function of a total number of idle compute cycles of the central processing unit in a given time period, and gathering a latency associated with an input/output (IO) operation;
a component configured to identify a particular computing system of the multiple computing systems using the monitored performance by determining a current state of execution of the particular computing system as a function of the gathered utilization of the central processing unit and the gathered latency associated with the IO operation, the particular computing system being identified for an allocation of additional computing power;
a component configured to determine availability of an additional power supply to allocate to the particular computing system, the additional power supply being a function of the additional computing power;
a component configured to determine availability of a capacity on a power distribution line connected to the particular computing system to provide the additional power supply to the particular computing system by predicting a peak power load of the power distribution line as a function of a current power load and historical power usage patterns, and determining a difference between the predicted peak power load and a maximum power threshold of the power distribution line; and
a component configured to allocate the additional computing power to the particular computing system as a function of the determined availability of the additional power supply and the determined availability of the capacity on the power distribution line.

9. The system of claim 8, wherein allocating the additional computing power to the particular computing system further comprises:
a component configured to send a signal to the particular computing system to change a performance state of a central processing unit of the particular computing system, the performance state being changed from a first performance state to a second performance state,
wherein the central processing unit in the second performance state has a greater number of compute cycles in a given time period than the central processing unit in the first performance state, a portion of the additional power supply being drawn by the particular computing system when the performance state of the central processing unit is changed from the first performance state to the second performance state.

10. The system of claim 8, further comprising:
a component configured to determine a current power load of a circuit breaker associated with the power distribution line connected to the particular computing system;
a component configured to determine an expected peak power load of the circuit breaker as a function of the current power load and the additional power supply; and
a component configured to determine the availability of the capacity on the power distribution line as a function of the expected peak power load of the circuit breaker and a maximum power threshold of the circuit breaker.

11. The system of claim 8, further comprising:
a component configured to determine a total power supply available to the multiple computing systems in the data center;
a component configured to determine a portion of the total power supply previously allocated to the multiple computing systems;
a component configured to determine an unallocated portion of the total power supply as a function of the total power supply and the previously allocated portion of the total power supply;
a component configured to determine a reclaimable portion of the total power supply from the previously allocated portion of the total power supply, the reclaimable portion of the total power supply being determined as a function of a portion of the total power supply previously allocated to a subset of the multiple computing systems,
wherein each of the subset of the multiple computing systems is executing a lower priority task compared to a priority of a task being executed by the particular computing system; and a component configured to determine the availability of the additional power supply to allocate to the particular computing system as a function of the determined unallocated portion of the total power supply and the determined reclaimable portion of the total power supply.

12. The system of claim 8, further comprising:
a component configured to identify the particular computing machine using the monitored performance for allocation of additional computing power when the current state of execution of the particular computing system exceeds a predetermined execution threshold.

13. The system of claim 12, further comprising:
a component configured to monitor the performance of the particular computing system after allocating the additional computing power to the particular computing system; and
a component configured to revoke the allocation of the additional computing power when the current state of execution of the particular computing system is lower than the predetermined execution threshold.

14. A non-transitory computer readable storage memory storing computer executable instructions, comprising:
instructions for monitoring performance of each given computing system of multiple computing systems in a data center, wherein the instructions for monitoring performance include instructions for gathering a utilization of a central processing unit of the given computing system determined as a function of a total number of idle compute cycles of the central processing unit in a given time period, and instructions for gathering a latency associated with an input/output (IO) operation;
instructions for identifying a particular computing system of the multiple computing systems using the monitored performance by determining a current state of execution of the particular computing system as a function of the gathered utilization of the central processing unit and the gathered latency associated with the IO operation, the particular computing system being identified for an allocation of additional computing power;
instructions for determining availability of an additional power supply to allocate to the particular computing system, the additional power supply being a function of the additional computing power;
instructions for determining availability of a capacity on a power distribution line connected to the particular computing system to provide the additional power supply to the particular computing system by predicting a peak power load of the power distribution line as a function of a current power load and historical power usage patterns, and determining a difference between the predicted peak power load and a maximum power threshold of the power distribution line; and
instructions for allocating the additional computing power to the particular computing system as a function of the determined availability of the additional power supply and the determined availability of the capacity on the power distribution line.

15. The non-transitory computer readable storage memory of claim 14, wherein allocating the additional computing power to the particular computing system further comprises:
instructions for sending a signal to the particular computing system to change a performance state of a central processing unit of the particular computing system, the performance state being changed from a first performance state to a second performance state,
wherein the central processing unit in the second performance state has a greater number of compute cycles in a given time period than the central processing unit in the first performance state, a portion of the additional power supply being drawn by the particular computing system when the performance state of the central processing unit is changed from the first performance state to the second performance state.

16. The non-transitory computer readable storage memory of claim 14, wherein determining the availability of the capacity on the power distribution line further comprises:
instructions for determining a current power load of a circuit breaker associated with the power distribution line connected to the particular computing system;
instructions for determining an expected peak power load of the circuit breaker as a function of the current power load and the additional power supply; and
instructions for determining the availability of the capacity on the power distribution line as a function of the expected peak power load of the circuit breaker and a maximum power threshold of the circuit breaker.

17. The non-transitory computer readable storage memory of claim 14, wherein determining the availability of the additional power supply to allocate to the particular computing system further comprises:
instructions for determining a total power supply available to the multiple computing systems in the data center;
instructions for determining a portion of the total power supply previously allocated to the multiple computing systems;
instructions for determining an unallocated portion of the total power supply as a function of the total power supply and the previously allocated portion of the total power supply;
instructions for determining a reclaimable portion of the total power supply from the previously allocated portion of the total power supply, the reclaimable portion of the total power supply being determined as a function of a portion of the total power supply previously allocated to a subset of the multiple computing systems,
wherein each of the subset of the multiple computing systems is executing a lower priority task compared to a priority of a task being executed by the particular computing system; and
instructions for determining the availability of the additional power supply to allocate to the particular computing system as a function of the determined unallocated portion of the total power supply and the determined reclaimable portion of the total power supply.

18. The non-transitory computer readable storage memory of claim 14, wherein identifying the particular computing system of the multiple computing systems using the monitored performance for allocation of additional computing power further comprises:
instructions for identifying the particular computing machine using the monitored performance for allocation of additional computing power when the current state of execution of the particular computing system exceeds a predetermined execution threshold.

19. The non-transitory computer readable storage memory of claim 18, further comprising:

instructions for monitoring the performance of the particular computing system after allocating the additional computing power to the particular computing system; and instructions for revoking the allocation of the additional computing power when the current state of execution of the particular computing system is lower than the predetermined execution threshold.

* * * * *

UNITED STATES PATENT AND TRADEMARK OFFICE
CERTIFICATE OF CORRECTION

PATENT NO. : 10,379,558 B2
APPLICATION NO. : 14/458677
DATED : August 13, 2019
INVENTOR(S) : Xiaojun Liang et al.

Page 1 of 1

It is certified that error appears in the above-identified patent and that said Letters Patent is hereby corrected as shown below:

On the Title Page

In Column 1, item (72), Inventors, Line 3, delete "Ming" and insert -- Min --, therefor.

Signed and Sealed this
First Day of October, 2019

Andrei Iancu
*Director of the United States Patent and Trademark Office*